(12) United States Patent
Whitehead et al.

(10) Patent No.: US 11,579,520 B2
(45) Date of Patent: Feb. 14, 2023

(54) LIGHT FIELD DISPLAY

(71) Applicant: The University of British Columbia, Vancouver (CA)

(72) Inventors: Lorne Arthur Whitehead, Vancouver (CA); Robin Atkins, San Jose, CA (US)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 17/307,875

(22) Filed: May 4, 2021

(65) Prior Publication Data
US 2021/0349384 A1     Nov. 11, 2021

Related U.S. Application Data

(60) Provisional application No. 63/020,442, filed on May 5, 2020.

(51) Int. Cl.
| | |
|---|---|
| *G03B 35/20* | (2021.01) |
| *G03B 33/10* | (2006.01) |
| *G02B 5/02* | (2006.01) |
| *H04N 9/31* | (2006.01) |
| *G02B 13/16* | (2006.01) |
| *G02B 30/52* | (2020.01) |
| *G02B 13/18* | (2006.01) |

(52) U.S. Cl.
CPC ............... *G03B 35/20* (2013.01); *G02B 5/02* (2013.01); *G02B 13/16* (2013.01); *G02B 13/18* (2013.01); *G02B 30/52* (2020.01); *G03B 33/10* (2013.01); *H04N 9/3185* (2013.01)

(58) Field of Classification Search
CPC .. G02B 13/002; G02B 13/0045; G02B 13/18; G02B 13/20; G02B 13/22; H04N 13/20; H04N 13/30; H04N 13/307; H04N 13/351; H04N 13/363; G03B 30/52; G03B 33/10; G03B 35/20
See application file for complete search history.

(56) References Cited

U.S. PATENT DOCUMENTS

| | | |
|---|---|---|
| 4,147,419 A | 4/1979 | Boyan |
| 9,182,605 B2 | 11/2015 | Goulanian |
| (Continued) | | |

OTHER PUBLICATIONS

Atkins, Robin, A New Spatio-Angular Light-Field Display for Improving Wellbeing in Windowless Spaces, Thesis, Mar. 2020.

*Primary Examiner* — Sultan Chowdhury
(74) *Attorney, Agent, or Firm* — Todd A. Rattray; Oyen Wiggs Green & Mutala LLP

(57) ABSTRACT

An angular image of a scene may be displayed using a light field display. The light field display may comprise a plurality of projection units. Each of the projections units may comprise an imaging system and an optical system. The imaging system may illuminate pixels of a planar image of the scene. Light corresponding to each of the pixels may be directed towards the optical system. The optical system may comprise first and second lenses for redirecting each light beam corresponding to a pixel in different directions. In some embodiments the first and second lenses form a globe lens. A diffusion system may conceal the optical systems. Additionally, or alternatively, the diffusion system may produce a uniform distribution of light at a plurality of different viewing angles.

17 Claims, 7 Drawing Sheets

(56) References Cited

U.S. PATENT DOCUMENTS

| | | |
|---|---|---|
| 9,291,800 B2 | 3/2016 | Inomoto et al. |
| 9,405,124 B2 | 8/2016 | Hirsch et al. |
| 9,715,117 B2 | 7/2017 | Meacham |
| 2004/0090600 A1* | 5/2004 | Blei .................... H04N 9/3105 353/31 |
| 2005/0213182 A1* | 9/2005 | Cossairt ............... H04N 13/363 348/E13.058 |
| 2009/0310087 A1* | 12/2009 | Itoh ..................... H04N 9/3152 353/38 |
| 2010/0165296 A1* | 7/2010 | Yamada ............... G03B 21/006 353/38 |
| 2010/0271598 A1* | 10/2010 | Murayama ............ G02B 27/48 353/38 |
| 2011/0285968 A1* | 11/2011 | Huang ................. H04N 9/3147 353/30 |
| 2014/0300869 A1 | 10/2014 | Hirsch et al. |
| 2015/0319429 A1 | 11/2015 | Lapstun |
| 2016/0025273 A1* | 1/2016 | van de Ven ............. F21K 9/23 362/293 |
| 2016/0313567 A1* | 10/2016 | Kurashige ............. G02B 26/10 |
| 2017/0153769 A1* | 6/2017 | Miura ................... G06F 3/0418 |
| 2017/0261758 A1 | 9/2017 | Powell |
| 2018/0003364 A1 | 1/2018 | Wheatley et al. |

* cited by examiner

LIGHT FIELD DISPLAY

CROSS-REFERENCE TO RELATED APPLICATIONS

This application claims the benefit under 35 U.S.C. § 119 of U.S. application No. 63/020,442 filed 5 May 2020 and entitled LIGHT FIELD DISPLAY which is hereby incorporated herein by reference for all purposes.

FIELD

This invention relates to light field displays, which display so-called angular images that appear to have depth because the display simultaneously presents different images for different viewing angles. Such images may be of an outdoor scene, for example. Example embodiments provide display systems that can be applied for simulating a partially diffusing window. The invention has non-limiting example applications in expanding perceived amounts of space within internal environments.

BACKGROUND

As human populations grow across the world, humans are moving into increasingly dense interior spaces. As population density increases, an availability of distant and/or open views that may be visible decreases. For example, interior spaces (e.g. rooms that are not adjacent to an outer wall of a building) may not have windows. Even if a room adjacent to an outer wall provides a window, the window may face nearby opposing buildings or the like. A lack of perceived openness may have adverse psychological impacts.

For example, an occupant's mood may decrease if the occupant perceives themselves as being confined in an interior space. As another example, the occupant's productivity may decrease. Simulating distant and/or open views may therefore assist with improving an occupant's mental health, mood, productivity and/or the like.

Human's may, for example, perceive openness by perceiving a scene comprising objects or elements at a plurality of depth planes.

A principle depth cue in perceiving depth (e.g. when a human looks through a window) is known as motion parallax. For example, a more distant object will appear to move less, or remain in a fixed position (or direction), as a viewer moves around compared to an object that is relatively close to the viewer. If a blue sky with a few clouds is viewed, the direction of the clouds and sun remain steady as the viewer views the sky from varying positions. The viewer may subconsciously therefore interpret this as a distant view. In contrast, an object that is very close to the viewer changes its relative orientation much more than a relatively more distant object, causing the closer object to be perceived as being nearby.

Another principle in perceiving depth is that portions of a scene may become visible or occluded by objects of different depths (e.g. a window frame or other objects within a scene) as viewing positions change.

Reducing a number of windows and/or sizes of windows that may enclose an interior space may also reduce an amount of natural light that may illuminate the interior space. Thus, the overall luminance of a lighting system for the interior space may need to be increased to compensate for the loss of natural light. This may, for example, increase energy consumption of the lighting system. The quality, intensity, position, color and/or directionality of the lighting are also known to influence the mood of the occupant.

There is a general desire for practical systems and methods that can be applied to simulate a perception of openness within an interior space. There is also a general desire for practical systems and methods that can be applied to increase energy efficiency, and/or to provide a provide a more configurable arrangement of light sources, of lighting systems that may be used to illuminate an interior space.

SUMMARY

This invention has a number of aspects. These include, without limitation:
    apparatus for displaying an angular image;
    methods and apparatus for simulating a partially diffusing window;
    methods and apparatus for illuminating an interior space;
    methods and apparatus for providing a stable visual reference.

One aspect of the invention provides a light field display for displaying an angular image having a plurality of depth planes, the light field display comprising: a plurality of projection units spaced laterally apart from one another in one or more lateral directions, each projection unit having an optical axis which is orthogonal to the one or more lateral directions. Each projection unit comprises: an imaging system for providing a precursor image on an image plane; an optical system comprising one or more lenses shaped and located to receive light from pixels of the precursor image and to emit redirected light transmitted therethrough; and a diffusion system located to receive the redirected light and operative to laterally spread light that is transmitted therethrough and to thereby emit diffuse light. The diffuse light emitted from the diffusion systems of the plurality of projection units provides an angular image having a plurality of depth planes perceptible to a human viewer. The lateral spreading of the diffuse light emitted from the diffusion systems of the plurality of projection units obfuscates the existence of the projection units from being discernable within the angular image by the human viewer.

Another aspect of the invention provides a method for forming an angular image having a plurality of depth planes, the method comprising: for each of a plurality of projection units spaced laterally apart from one another in one or more lateral directions: forming a precursor image on an image plane; with an optical system located in front of the image plane and comprising one or more lenses: receiving light emitted from two or more pixels of the precursor image; and redirecting the received light in a plurality of different directions to emit redirected light; and laterally spreading the redirected light with a diffusion system to emit diffuse light. The diffuse light emitted from the diffusion systems of the plurality of projection units provides an angular image having a plurality of depth planes perceptible to a human viewer. The lateral spreading of the diffuse light emitted from the diffusion systems of the plurality of projection units obfuscates the existence of the projection units from being discernable within the angular image by the human viewer.

The diffusion system may be shaped and/or located to obfuscate angular distortions introduced by one or both of the optical system and the imaging system.

The diffusion system may comprise a first diffuser proximate, in an axial direction, to the optical system and a second diffuser spaced apart, in the axial direction, from the first diffuser.

The diffusion system may be shaped and/or located to balance between a first objective of minimizing spatial diffusion of the diffuse light and a second objective of spatial uniformity of the diffuse light.

The balance between the first objective and the second objective may be an optimal balance determined by optimizing an objective function comprising a spatial diffusion term that assigns cost to spatial diffusion and a spatial uniformity term that assigns cost to a lack of spatial uniformity.

One or both of the first and second diffusers may extend laterally such that the one or both of the first and second diffusers provides at least a portion of the diffusion system for a plurality of laterally adjacent projection units.

The first diffuser may increase spatial uniformity of the diffuse light relative to the redirected light and the second diffuser may increase angular uniformity of the diffuse light relative to the redirected light.

The diffusion system may be shaped, for a given viewing angle ø, to produce a distribution of light provided at least approximately by L(ø), where:

$$L(\phi) = \begin{cases} \frac{3}{4s} - \phi^2, & |\phi| \le \frac{s}{2} \\ \frac{1}{2s^3}\left(|\phi| - \frac{3s}{2}\right)^2, & \frac{s}{2} < |\phi| \le \frac{3s}{2} \\ 0, & |\phi| > \frac{3s}{2} \end{cases}$$

where $s = \tan^{-1}(\text{lens spacing}/d_{\text{diffuser spacing}})$.

The term lens spacing may be an axial direction distance between opposing inner surfaces of lenses of the optical system and the term $d_{\text{diffuser spacing}}$ may be an axial distance between the first and second diffusers.

The diffusion system may comprise a single diffuser.

The optical system may comprise a first lens and a second lens. The first and second lenses may be at different locations in the axial direction.

The first and second lenses may be shaped and/or located to provide a globe lens.

One or both of the first and second lenses may comprise at least one of a meniscus lens, a biconvex lens and a planar-convex lens.

One or both of the first and second lenses may comprise faceted surfaces.

One or both of the first and second lenses may comprise a Fresnel lens.

The first and second lenses may be symmetric.

The first and second lenses may be spaced apart from one another in an axial direction by a gap. The gap may be an air-gap.

The optical system may further comprise an optical aperture located in the gap between the first and second lenses.

The optical aperture may comprise an opaque element shaped to block light impinging on the optical aperture at locations relatively distal from an optical axis of the projection unit and to define an aperture for transmitting light impinging on the optical aperture at locations relatively proximate to the optical axis of the projection unit.

The aperture may be shaped to reduce effects of optical aberrations introduced by one or more optical elements of the projection unit.

A size of the aperture may be variable in real time.

One or both of the first and second lenses may be shaped and/or located to achieve an objective of minimizing at least one of optical aberrations and curvature of field.

At least one of optical power, index of refraction, thickness, radii of curvature of each lens surface and a location of one or both of the first and second lenses may be determined by an optimization process comprising optimizing an objective function.

The objective function may comprise an optical aberration term, the optical aberration term assigning cost to one or more optical aberrations of one or both of the first and second lenses.

The objective function may comprise a curvature of field term, the curvature of field term assigning cost to curvature of field of one or both of the first and second lenses.

The objective function may comprise an angle of incidence term, the angle of incidence term assigning cost to angular errors in the redirected light which are different as between different angles of incidence of light from pixels of the precursor image.

Each of the cost terms in the objective function may be assigned a different weight.

An outer surface of the first lens may be axially spaced apart from the image plane by a focal distance of the first lens.

Each of the plurality of projection units may be arranged to form a lateral grid-like pattern of projection units. The grid-like pattern may span an entire laterally extending plane of the light field display.

Each of the projection units may have a lateral cross-section dimension of about 2.5 cm.

Adjacent pixels of the precursor image may be directed at different angles of the angular image.

The precursor image may be formed using an integral imaging technique.

The imaging system may comprise a light source operable to emit light. The imaging system may also comprise a field lens shaped and/or located to receive the emitted light and to transmit the light therethrough to illuminate the image plane.

The light source may comprise a LED. The light source may comprise a plurality of light emitters. The plurality of light emitters may comprise a plurality of LEDs. The light source may emit white light. The light source may emit monochromatic light.

The plurality of LEDs may comprise a red LED, a blue LED and a green LED.

The imaging system may further comprise a reflector, the reflector configured to reflect light emitted by the light source towards the optical system. An active reflecting surface of the reflector may be flat. An active reflecting surface of the reflector may be curved.

The reflector may re-reflect light reflected from one or more elements of the projection unit back towards the optical system.

The light field display may comprise an additional lens located between the light source and the field lens, the additional lens shaped and/or located to at least one of spatially spread and angularly spread the light emitted from the light source.

The field lens may be shaped and/or located to focus light towards the optical system or an aperture of the optical system. The field lens may be located a first focal distance away from the light source and a second focal distance away from the aperture of the optical system. The field lens may be configured to transmit light which illuminates the image plane with light comprising a uniform light distribution.

The field lens may comprise one or both of a first optical element and a second optical element. The second optical element may be located immediately adjacent the first optical element. The first optical element of the field lens may be configured to collimate light received from the light source. The first optical element of the field lens may be axially spaced apart from the light source by its focal distance. The second optical element of the field lens may be configured to focus light towards the optical system through the image plane. The second optical element of the field lens may be shaped to focus light towards an aperture of the optical system.

One or both of the first and second optical elements of the field lens may comprise faceted surfaces. One or both of the first and second elements of the field lens may comprise a Fresnel lens.

A light source may illuminate at least two of the plurality of projection units.

The light field display may comprise a field lens located between the light source and image planes of the at least two projection units.

The image plane may recycle light that does not pass through the optical system.

The image plane may be an active element.

The image plane may comprise at least one of an LCD panel and a light-valve display. The image plane may be operable to update the precursor image dynamically in real time.

The image plane may be a passive element. The image plane may comprise a printed transparency.

The image plane may be self-illuminated.

The image plane may comprise at least one of a backlit display and a backlight-less display. The backlight-less display may comprise an LED display or an OLED display. The backlit display may comprise a backlit LCD display.

The image plane may comprise 3840 by 2160 pixels.

The image plane may be operable to compensate for distortions introduced by the optical system.

The image plane may comprises red, green and blue precursor images, each of the precursor images generated in a different way to compensate for chromatic aberration.

The image plane may be operable to introduce radial distortions in the precursor image to reduce radial distortions of the optical system.

The image plane may project a plurality of different precursor images.

The optical system may comprise a plurality of materials having different indices of refraction to reduce chromatic aberrations.

The light field display may comprise at least one high intensity light source. The high intensity light source may be operable to emit a high intensity light beam comprising light rays which would be transmitted parallely relative to one another through the optical system. The high intensity light beam may have an intensity higher than light emitted by the imaging system to simulate sun rays.

The light field display may comprise one or more motion sensors operative to detect one or more changes in orientation of the light field display. The light field display may also comprise an image processing engine configured to adjust the precursor image based on the one or more detected changes in orientation to produce an angular image that counters one or more of the detected changes in orientation.

The one or more motion sensors may comprise at least one accelerometer.

Another aspect of the invention provides a light field display for displaying an angular image, the light field display comprising a plurality of projection units spaced laterally apart from one another in one or more lateral directions, each projection unit having an optical axis which is orthogonal to the one or more lateral directions. Each projection unit comprises an imaging system for providing a precursor image on an image plane. Each projection unit also comprises an optical system comprising one or more lenses shaped and located to receive light from pixels of the precursor image and to emit redirected light transmitted therethrough. Each projection unit also comprises a diffusion system located to receive the redirected light and operative to laterally spread light that is transmitted therethrough and to thereby emit diffuse light. The diffuse light emitted from the diffusion systems of the plurality of projection units provides an angular image perceptible to a human viewer. Adjacent pixels of the precursor image are directed at different angles of the angular image. The lateral spreading of the diffuse light emitted from the diffusion systems of the plurality of projection units obfuscates the existence of the projection units from being discernable within the angular image by the human viewer.

Another aspect of the invention provides a method for forming an angular image, the method comprising: for each of a plurality of projection units spaced laterally apart from one another in one or more lateral directions: forming a precursor image on an image plane; with an optical system located in front of the image plane and comprising one or more lenses: receiving light emitted from two or more pixels of the precursor image; and redirecting the received light in a plurality of different directions to emit redirected light; and laterally spreading the redirected light with a diffusion system to emit diffuse light. The diffuse light emitted from the diffusion systems of the plurality of projection units provides an angular image perceptible to a human viewer. The lateral spreading of the diffuse light emitted from the diffusion systems of the plurality of projection units obfuscates the existence of the projection units from being discernable within the angular image by the human viewer.

The angular image may have a plurality of depth planes.

The diffusion system may comprise a first diffuser proximate, in an axial direction, to the optical system and a second diffuser spaced apart, in the axial direction, from the first diffuser.

The diffusion system may be shaped and/or located to balance between a first objective of minimizing spatial diffusion of the diffuse light and a second objective of spatial uniformity of the diffuse light.

The diffusion system may be shaped, for a given viewing angle $\phi$, to produce a distribution of light provided at least approximately by $L(\phi)$, where:

$$L(\phi) = \begin{cases} \dfrac{3}{4s} - \phi^2, & |\phi| \le \dfrac{s}{2} \\ \dfrac{1}{2s^3}\left(|\phi| - \dfrac{3s}{2}\right)^2, & \dfrac{s}{2} < |\phi| \le \dfrac{3s}{2} \\ 0, & |\phi| > \dfrac{3s}{2} \end{cases}$$

where $s = \tan^{-1}(\text{lens spacing}/d_{\textit{diffuser spacing}})$

The term lens spacing may be an axial direction distance between opposing inner surfaces of lenses of the optical system and $d_{\textit{diffuser spacing}}$ may be an axial distance between the first and second diffusers.

The optical system may further comprise a first lens and a second lens that are shaped and/or located to provide a globe lens.

The optical system may further comprise a first lens and a second lens. One or both of the first and second lenses may comprise faceted surfaces. One or both of the first and second lenses may comprise a Fresnel lens.

The optical system may further comprise a first lens and a second lens and an optical aperture located in a gap between the first and second lenses.

Each of the plurality of projection units may be arranged to form a lateral grid-like pattern of projection units that spans an entire laterally extending plane of the light field display. Each of the plurality of projection units may also comprise a light source operable to emit light. Each of the plurality of projection units may also comprise a field lens shaped and/or located to receive the emitted light and focus the emitted light through an aperture of the optical system.

Each of the projection units may have a lateral cross-section dimension of about 2.5 cm.

The image plane may be an active element that is operable to update the precursor image at any time.

The image plane may be operable to compensate for distortions introduced by the optical system.

The image plane may comprise red, green and blue precursor images, each of the precursor images generated in a different way to compensate for chromatic aberration.

The light field display may comprise one or more motion sensors operative to detect one or more changes in orientation of the light field display. The light field display may also comprise an image processing engine configured to adjust the precursor image based on the one or more detected changes in orientation to produce an angular image that counters one or more of the detected changes in orientation.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Figure 1:
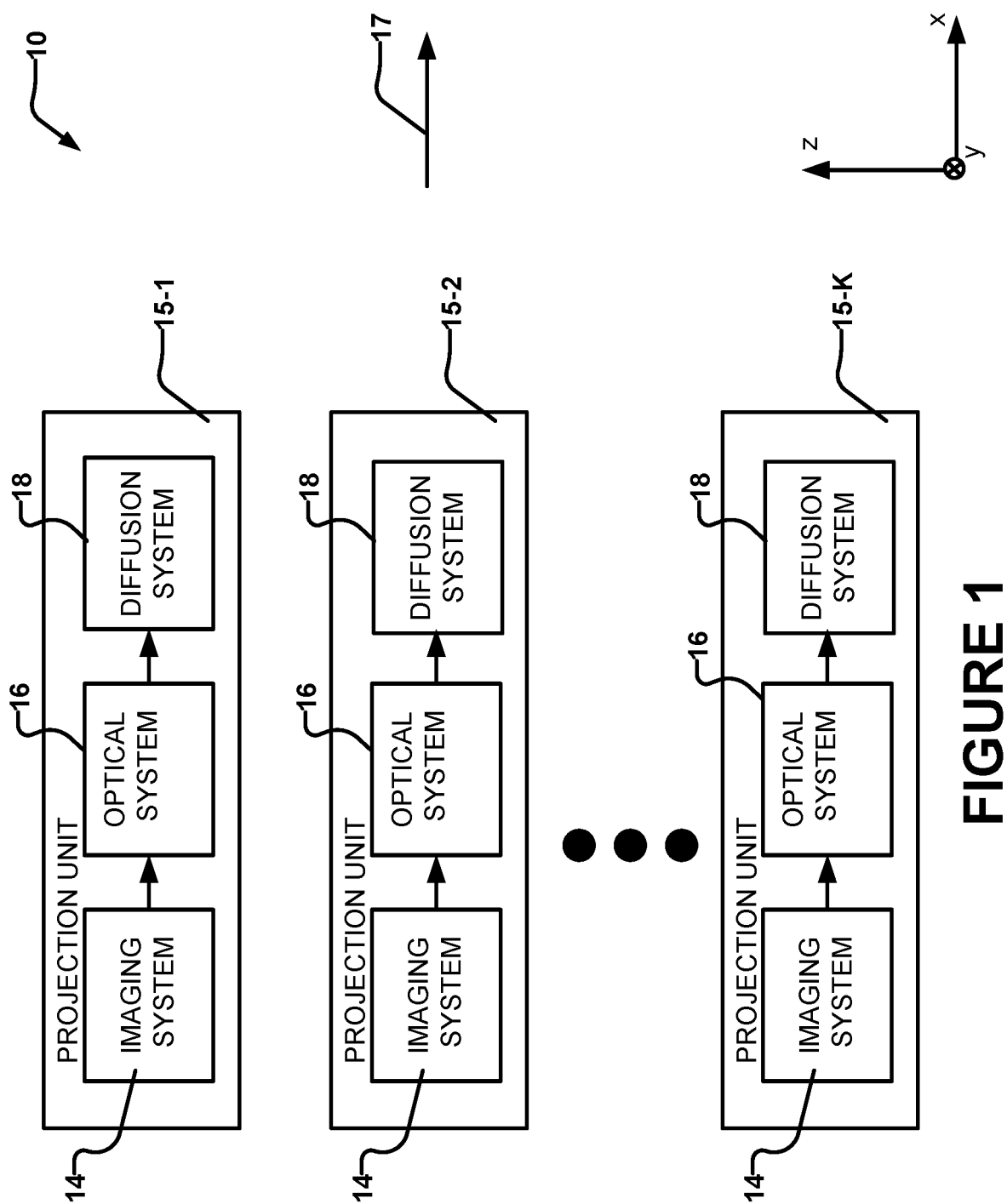
FIG. 1 is a schematic illustration of a low resolution light field display comprising a plurality of projection units according to a particular example embodiment.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

One aspect of the invention provides a novel light field display. The disclosed light field display may emulate a partially diffusing window (e.g. a privacy window). In some embodiments the light field display is indistinguishable from a partially diffusing window. "Indistinguishable" means that a person with normal human vision would not be able to differentiate an image of a scene displayed by the light field display described in particular embodiments herein from viewing the same scene through a partially diffusing window.

Because a light field display displays an angular image that is perceived to have depth, a light field display may use many more pixels than a conventional display (relatively high pixel count) to achieve the same image quality. Further, to support a wide viewing angle and high resolution, the optics associated with a light field display are desirably relatively free of aberrations (e.g. spherical, curvature of field, chromatic and/or the like) as compared to the optics for conventional displays. These requirements for high pixel count and optics with minimal aberration make it practically infeasible to make high-resolution light field displays (of sufficient size to simulate a normal (non-diffusing) window) with today's technology. Light field displays according to aspects of the invention may provide relatively low resolution displays. Such low resolution light-field displays may be suitable for simulating a partially diffusing window, for example. Notably, human vision does not require high resolution information to perceive depth in a scene.

According to some aspects of the invention, a light field display may comprise a plurality of projection units. Each projection unit may comprise an imaging system, an optical system and a diffusion system. The imaging system may provide (e.g. form and/or illuminate) a precursor image on an image formation plane. The precursor image formed on the image formation plane may comprise a plurality of pixels. The characteristics of a precursor image suitable for use to generate an angular image using a light field display are known. Any suitable technique may be used to provide a precursor image for use to generate an angular image using the light field display. The optical system may focus and/or redirect light from the pixels of the precursor image in a plurality of different directions to produce an angular image. The angular image may comprise one or a plurality of depth planes (e.g. an image comprising different views corresponding to different viewing angles). The diffuser system may spread light laterally (i.e. in directions parallel with the image formation plane and/or orthogonal to a principal optical axis of the system) and may thereby: conceal the existence of or otherwise obfuscate individual projection units from perception by a human viewer (i.e. provide a degree of spatial uniformity in the angular image that obfuscates the individual projection units from perception); produce an angular image with relatively uniform angular distribution of light (angular diffusion) across different viewing angles; and/or provide an angular image which masks any angular error introduced by the optical system.

Introduction to Low Resolution Light Field Display

FIG. 1 is a schematic depiction of a low resolution light field display 10 according to a particular example embodiment of the invention. Light field display 10 comprises a plurality of projection units 15-1, 15-2, . . . 15-K (collectively projection units 15). While not expressly shown in FIG. 1, projection units 15 may be arranged to provide a 2-dimensional array of projection units 15 extending in lateral dimensions (the y and z dimensions shown in FIG. 1). In contrast with the lateral directions (y and z in FIG. 1), the x-axis direction (which is orthogonal to both lateral directions) may be referred to as the axial direction or normal direction. A principal optical axis of light field display 10 (schematically illustrated by arrow 17) may extend in the axial direction. As shown in FIG. 1, each projection unit 15 may comprise an imaging system 14, an optical system 16 and a diffusion system 18. These systems 14, 16 and 18 are explained in more detail below.

Light field display 10 may display a low resolution angular image. To convey depth, light field display 10 may display different images simultaneously at different viewing angles. This combination of images at different viewing angles may be referred to as an angular image. An angular image may provide a number of so-called "depth planes" that simulate the depths of objects when viewed at different angles. These characteristics of an angular display may permit light field display 10 to provide a perception of depth and/or spaciousness to a human viewer. In this manner, light field display 10 may simulate the effect of looking at a scene comprising one or more objects through a partially diffusing window.

Desirable simulation of a partially diffusing window or otherwise providing a light field display according to aspects of the invention may involve attempting to satisfy a number of objectives. In typical applications, satisfying some such objectives may involve sacrificing other such objectives—that is, not all objectives may be simultaneously satisfied. Consequently, in some embodiments, desirable simulation of a partially diffusing window or otherwise providing a light field display according to aspects of the invention may involve balancing between objectives. In some embodiments, balancing between competing objectives may involve optimizing (e.g. minimizing or maximizing) an objective function (also known as a cost function) which assigns value to particular objectives and/or cost to the non-achievement of particular objectives. It will be appreciated that objectives described herein are not, unless expressly specified, requirements.

The Objective of Sufficient Angular Resolution

Typically, a person (having normal human vision) is able to distinguish individual objects through a partially diffusing window, even if the individual objects do not appear to be sharp (of high resolution). Consequently, it may be desirable, for simulating a partially diffusing window, to allow viewers to distinguish objects in the angular image. The ability to distinguish between individual objects in an angular image is positively correlated with angular resolution of the angular image. This disclosure refers to concepts of angular resolution and spatial resolution. To be clear, where this disclosure refers to increasing angular or spatial resolution, such increasing resolution is associated with decreasing a minimum discernable angle or minimum discernable spatial dimension. Conversely, where this disclosure refers to decreasing angular or spatial resolution, such decreasing resolution is associated with increases in a minimum discernable angle or minimum discernable spatial dimension. Angular diffusion of an object may be inversely proportional to (or inversely correlated with) angular resolution of light field display 10. Greater angular diffusion may result in lower angular resolution and hence a lower number of depth planes (and a correspondingly low visual acuity) that can be produced by light field display 10.

In some embodiment, light field display 10 may generate one depth plane. In some embodiments, light field display 10 may generate as few as two depth planes, which may be enough to convey a sense of depth. However, in general, increasing a number of depth planes (which involves a corresponding increase in angular resolution) may result in light field display 10 more faithfully emulating a partially diffusing window (e.g. producing a more realistic experience for a human viewer). Accordingly, an objective of the design of light field display 10 may involve attempting to provide an angular resolution that is sufficiently high to provide a desirable viewing experience.

The angular resolution of light field display 10 may be determined at least in part by: (i) spatial resolution of optical systems 16, and (ii) spatial resolution of imaging systems 14. Some embodiments of light field display 10 attempt to balance (e.g. to optimize) both these spatial resolution parameters. The spatial resolution of optical systems 16 may be determined by an amount of lateral spacing (e.g. in they or z directions in the FIG. 1 view) between individual optical systems 16 in the array of projection units 15. A desirability of light field display 10 is that a human viewer should not be able to easily discern between individual projection units 15 when viewing an image from light field display 10. The function of obfuscating individual projection units 15 is performed by diffusion systems 18 and is described in more detail below. At this stage, it will be appreciated that relatively large lateral spacing between individual optical systems 16 across the lateral cross-section of light field display 10 may involve correspondingly greater diffusion to obfuscate individual projection units 15.

The spatial resolution of imaging systems 14 may be positively correlated with (e.g. proportional to) a number of pixels (or pixel density) in the precursor image corresponding to each optical system 16, as described elsewhere herein. For a given set of optical systems 16, more pixels in the precursor images formed by imaging systems 14 results in an angular image having greater angular resolution—that is, the spatial resolution of imaging systems 14 and their corresponding precursor images is positively correlated with the angular resolution of light field display 10. With higher spatial resolution of imaging systems 14, the lenses within optical systems 16 (described further below) can be made smaller, and optical systems 16 can be made more dense in lateral cross-section (i.e. the lateral spacing between individual optical systems 16 can be made smaller). Increasing the lateral density of optical systems 16 can in turn decrease the amount of diffusion desired from diffusion systems 18 to obfuscate individual projection units 15. However, optical systems 16 having smaller lenses admit fewer pixels—i.e. their corresponding precursor images comprise fewer pixels. Consequently, for a given spatial resolution of imaging systems 14 (or for a given number of pixels in the precursor images generated by imaging system 14), smaller lenses in optical systems 16 (which may be associated with smaller lateral spacing between optical systems 16) result in lower angular resolution for the angular image generated by light field display 10.

Accordingly, for a given number of pixels in each precursor image (which may also be referred to as the spatial resolution of imaging systems 14), achieving the objective of providing light field display 10 with an angular image having an angular resolution that is sufficiently high to provide a desirable viewing experience may involve determining an optimal lateral spacing of individual optical systems 16, based on the optical characteristics of optical systems 16 and diffusion systems 18. The optimal lateral spacing of optical systems 16 may balance (or optimize) between: optical systems 16 that are too widely laterally spaced, requiring excessive diffusion (from diffusion systems 18) to obfuscate optical systems 16 and, thus, excessively reducing angular resolution; and optical systems 16 having small lateral spacing, resulting in fewer pixels in each precursor image for a given pixel density of imaging system 14, and, in turn, lower angular resolution for light field display 10.

The objective of causing light field display 10 to display an angular image with an angular resolution that is sufficiently high to provide a desirable viewing experience may involve optimizing an objective function. The objective function may assign cost for lateral spacing (between optical systems 16) that is too high and may assign cost for lateral spacing (between optical systems 16) that is too low. The cost term associated with lateral spacing that is too high may be based on one or more parameters associated with the properties of diffusion systems 18. The cost term associated with lateral spacing that is too low may be based on one or more parameters associated with the properties of optical systems 16. By way of non-limiting example, if we let $S_L$ be the lateral spacing between optical systems 16. The angular resolution of display 10 may be proportional to (or some other function that increases monotonically with) $a/S_L$, where a is a parameter relating to the properties of diffusion systems 18 (since greater diffusion is desired for greater $S_L$, to obfuscate individual optical systems 16). The angular resolution of a display may be related to the number of pixels in each precursor image that direct light into each corresponding optical system 16 in proportion to (or some other function that increases monotonically with) $bS_L$, where b is a parameter related to the properties of lenses in optical systems 16.

Accordingly, the objective function may comprise a term that is approximately proportional to $a/S_L+bS_L$, which is minimized when $$S_L = \sqrt{\frac{a}{b}},$$

where a and b respectively depend on properties of optical elements in diffusion systems 18 and optical systems 16.

The Objective of Consistent Angular Distribution Through Sufficiently Wide Field of View A partially diffusing window typically diffuses an image by similar amounts for a wide range of viewing angles. Preferably, light field display 10 generates an angular image where a magnitude of diffusion at a sufficiently wide range of different viewing angles is substantially or at least generally similar to a magnitude of diffusion when the light field display is viewed from a direction that is perpendicular to the light field display. One metric or measure of a magnitude of diffusion at any particular viewing angle is a width (e.g. a standard deviation) of the angular distribution of light intensity at that viewing angle. In some embodiments, the metric or measure of a magnitude of diffusion (e.g. a standard deviation of the angular distribution of light intensity) varies by less than 50% over a threshold range of viewing angles. In practice, this objective may be achieved by estimating a metric or measure of diffusion magnitude (e.g. standard deviation of the angular distribution of light intensity) for each pixel in precursor image 26A based on a set of parameters of imaging system 14, optical system 16 and/or diffusion system 18 and using an objective function that has an angular distribution term that assigns cost for different pixels having different values for the metric or measure of diffusion magnitude.

The Objective of Spatial Uniformity

Another objective for light field display 10 may be to produce a generally spatially uniform light field. "Spatially uniform" may be understood to mean that no visible pattern of light associated with the array of optical systems 16 or projection units 15 used to project the light is visible to human viewers with normal human vision who are observing a scene from display 10 under normal or typical viewing conditions. In practice, this objective may be achieved by simulating the intensities of light output by light field display 10 across a range of viewing positions/angles based on a set of parameters of imaging system 14, optical system 16 and/or diffusion system 18 and using an objective function that has a spatial uniformity term that assigns cost for different viewing positions/angles having different intensity. By way of non-limiting example, the spatial uniformity term may comprise a standard deviation of the intensities measured at the various viewing positions/angles and a relatively low (e.g. minimized) standard deviation may be associated with relatively spatially uniform light.

Preferably the light field display is operable to produce one or more angular images comprising one or more of the following properties:

An angular distribution of a light field associated with the angular image is independent of a viewing position up to a designed (e.g. minimum threshold) off-axis viewing angle (e.g. +/−40 degrees, +/−90 degrees, etc.).

An angular resolution of the light field is independent of the viewing position up to the same designed off-axis viewing angle.

Low Resolution Light Field Display in More Detail

Figure 2:
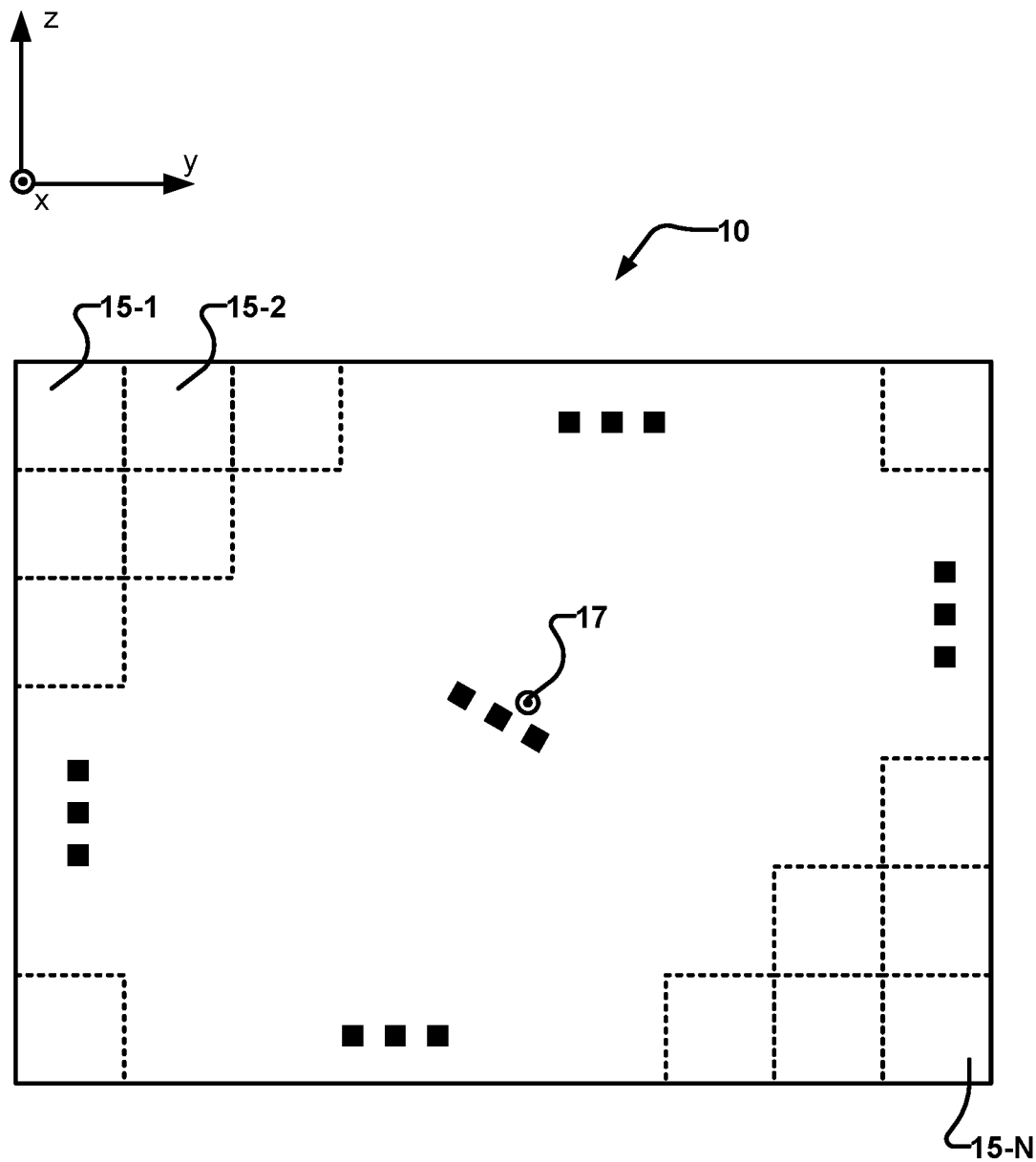
FIG. 2 schematically illustrates the FIG. 1 light field display from a different perspective.

FIG. 2 schematically depicts the FIG. 1 example light field display 10 from an axial perspective (see x-y-z axes shown in FIG. 1 versus FIG. 2). Light field display 10 comprises a plurality of projection units 15-1, 15-2, . . . , 15-K (each a "projection unit 15" and, collectively, projection units 15). As shown in FIG. 2, each of projection units 15 may be positioned adjacent other projection units 15 to form a lateral grid-like pattern of projection units 15. The grid-like pattern may span an entire transversely extending plane of display 10 that has a laterally central normal vector 17 which extends in the x direction and may be referred to herein as the principal optical axis 17 of display 10. Despite being illustrated as having a rectangular lateral cross-section in FIG. 2, the lateral cross-section of display 10 may have any suitable shape.

The plurality of projection units 15 may collectively display an angular image of a scene. The angular image may have one or a plurality of depth planes. The angular image displayed by display 10 may comprise a minimum desired angular resolution. Light field display 10 may redirect light beams corresponding to different pixels of the projected precursor image corresponding to each projection unit 15 in different directions to form the angular image.

In example embodiments, each projection unit 15 projects light from a plurality of pixels (or points) of its corresponding precursor image formed on an image formation plane. Light beams corresponding to each of the pixels are redirected in different directions. Accordingly, a person viewing display 10 from different viewing angles may see different light beams at different positions relative to principal optical axis 17 of display 10. Additionally, or alternatively, the person may see the same light beams differently at different positions. Thus, angular resolution of display 10 may be dependent on the number of pixels (or points) of the precursor image corresponding to each projection unit—i.e. the number of pixels that that are admitted by the optical system 16 of each projection unit 15.

To produce a high resolution angular image (e.g. a sharp image akin to viewing a scene through a clear window) using a light field display, each projection unit may need to be about the size of a pixel in presently available two-dimensional planar displays. For example, each pixel in a 55-inch UHD display having a resolution of 3840×2160 pixels has a lateral cross-sectional dimensions of about 0.317 mm. To produce the high resolution angular image, it may be desirable for each projection unit to redirect light beams across several thousand horizontal and vertical directions. Consequently, to achieve an angular image with resolution on the order of current UHD displays, it is desirable for the light field display to provide precursor images having orders of magnitude higher pixel counts than are presently available. Further, such pixel density might exceed the fundamental resolution limit associated with the small lenses of projection units which have such small lateral dimensions.

In contrast to trying to produce a high resolution image, light field display 10 generates a relatively low resolution angular image. By displaying angular images comprising gradual changes in depth (e.g. low resolution angular images akin to viewing a scene through a partially diffusing window), a size of each projection unit 15 may be increased. Advantageously, this desire for relatively low resolution may permit reduction of a number of projections units 15 in a display 10. Additionally, this desire for relatively low resolution may permit an increase in the size of the lenses in optical systems 16 and a corresponding increase in a number of pixels in each precursor image that may direct light into each corresponding optical system 16.

In some embodiments, each projection unit 15 may have a diameter (or other cross-sectional dimension) of about 2.5 cm. If image the global image formation plane (described elsewhere herein) emulates a 55-inch display, display 10 may comprise a total of 48×27 projection units 15, each having a diameter (or other cross-sectional dimension) of about 2.5 cm. As described elsewhere herein, the angular resolution may be determined in part by the number of pixels in the precursor image associated with each optical system 16 (or, equivalently, the spatial resolution of imaging systems 14). If the 55-inch display comprises a UHD display, this works out to (3840/48=80)×(2160/27=80) (e.g. 80×80 pixels in each precursor image corresponding to each optical system 16). The number of angular views may therefore be 80×80. For an 80-degree viewing angle, this may yield one angular view per degree of viewing angle.

Figure 3:
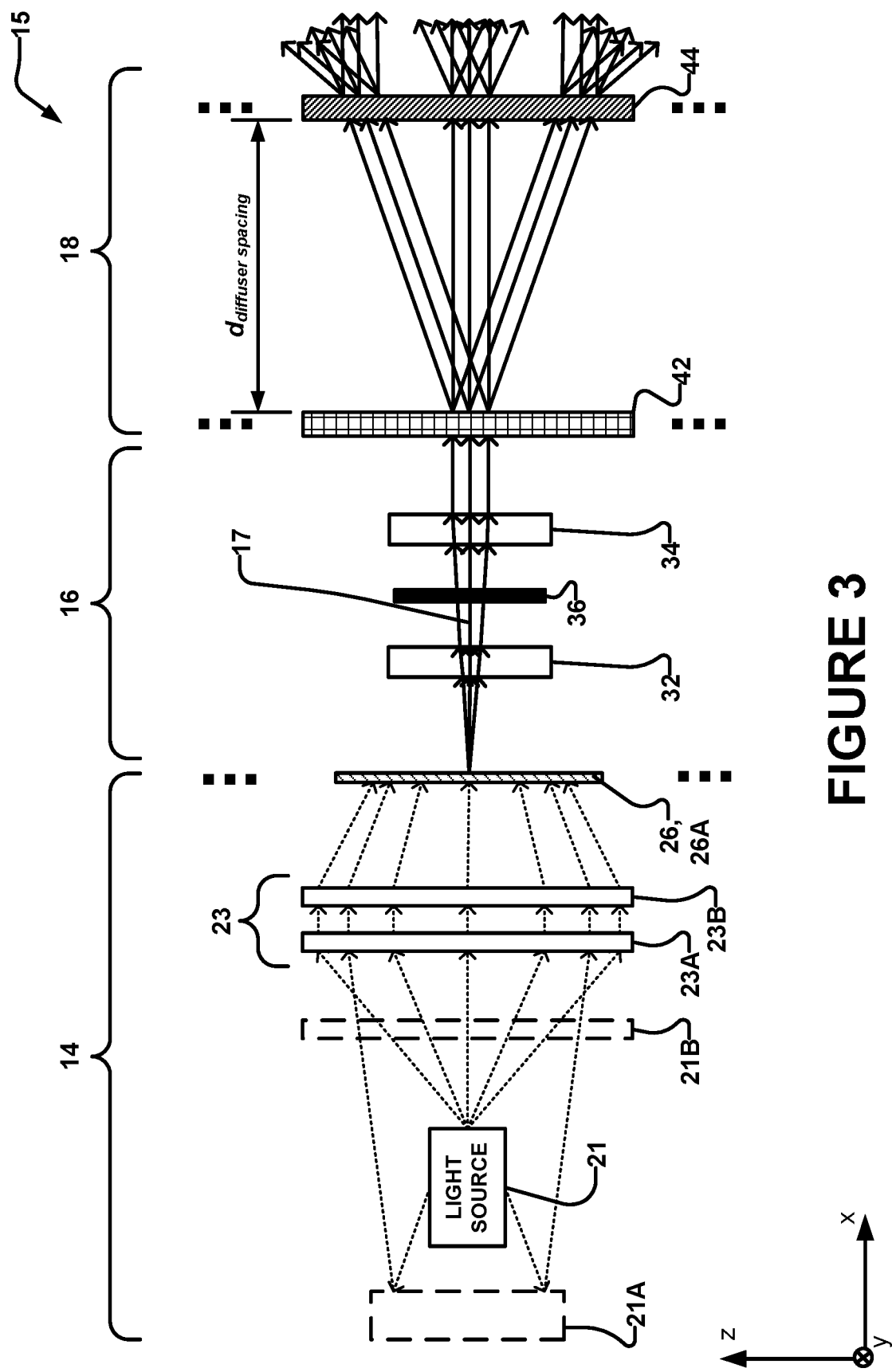
FIG. 3 schematically illustrates an example embodiment of a projection unit of the light field display of FIGS. 1 and 2.

FIG. 3 shows an example embodiment of a projection unit 15 suitable for use with the light field display 10 of FIGS. 1 and 2. Projection unit 15 comprises an imaging system 14. Imaging system 14 may form a specially processed precursor image 26A of a scene to be displayed by display 10 on an image formation plane 26. The special processing involved in forming the precursor image 26A on image formation plane 26 may involve generating a precursor image where adjacent pixels are directed at different angles. Techniques for generating precursor images 26A that may be used by light field displays to generate angular images are known and may be referred to integral imaging techniques.

In some embodiments, imaging system 14 comprises a light source 21. Light source 21 is operable to emit a light beam. At least some of the emitted light beam from light source 21 may illuminate (e.g. pass through) the remaining elements of projection unit 15. Typically, light source 21 emits a divergent beam of light (e.g. emits light in a plurality of directions within an angular range around central optical axis 17).

Light source 21 may be considered to be a point source, although this is not necessary. For example, light source 21 may comprise an LED or the like. In some embodiments, light source 21 comprises a plurality of light emitters, each of which may be considered to be a point source (e.g. a plurality of LEDs).

In currently preferred embodiments light source 21 emits white light. However, depending on the format of the precursor image 26A that is formed on image formation plane 26, light source 21 may emit a relatively monochromatic (single-colored) beam of light (e.g. a red beam). In some such embodiments light source 21 may comprise a light emitter which may be considered to be point source operable to emit a colored light beam (e.g. a red LED). In some embodiments light source 21 may comprise a plurality of light emitters, each of which may be considered to be a point source operable to emit a colored light beam (e.g. a red LED, a green LED and a blue LED).

A reflector 21A may optionally be positioned behind light source 21. Reflector 21A may direct light rays emitted from light source 21 towards optical system 16. For example, light rays emitted in a direction that is away from optical system 16 may be reflected back towards optical system 16 by reflector 21A. Additionally, or alternatively, interaction of emitted light rays with one or more elements of projection unit 15 may reflect light rays back towards light source 21. Reflector 21A may re-reflect such light rays back towards one or more elements of projection unit 15. In some embodiments an active surface of reflector 21A (e.g. a surface of reflector 21A that reflects light rays towards one or more elements of projection unit 15) is flat. In some embodiments an active surface of reflector 21A is curved.

Optionally, a lens 21B may be positioned in front of light source 21. Lens 21B may be designed (e.g. to have suitable shape, size, location and/or material(s)) to produce a relatively uniform light distribution at image formation plane 26.

A light beam emitted from light source 21 may be collected by field lens 23. Field lens 23 may focus the collected light towards optical system 16. Light focused by field lens 23 is incident on, and passes through, image formation plane 26. Field lens 23 (together with lens 21B) may be designed (e.g. to have suitable shape, size, location and/or material(s)) to illuminate image formation plane 26 with a uniform light distribution.

Field lens 23 may comprise a first element 23A and a second element 23B, although this is not necessary. In some embodiments, second element 23B is immediately adjacent first element 23A. In this context, "immediately adjacent" means that opposing surfaces of elements 23A and 23B physically contact each other. First element 23A may collimate light emitted from light source 21. In some embodiments, first element 23A is positioned a focal distance away from light source 21. Second element 23B may focus the collimated light towards optical system 16 through image formation plane 26. In some embodiments, second element 23B focuses the collimated light towards an aperture 36 (described elsewhere herein) of optical system 16, which may be located between lenses 32, 34.

In some embodiments, one or both of elements 23A and 23B may comprise faceted surfaces. In some such embodiments, one or both of elements 23A and 23B comprise Fresnel lenses. In some embodiments, one or both of elements 23A, 23B may be omitted, although such embodiments might have correspondingly low optical efficiency.

Although FIG. 3 illustrates projection unit 15 comprising its own light source 21 and field lens 23, this is not mandatory. In some embodiments a single light source 21 illuminates a plurality of projection units 15—e.g. laterally adjacent projection units 15 share a light source 21. In some embodiments a single light source 21 in combination with a single field lens 23 illuminates a plurality of projection units 15—e.g. laterally adjacent projection units share a light source and a field lens 23.

A precursor image 26A of a scene to be displayed by display 10 may be formed on image formation plane 26. In some embodiments the precursor image 26A is aligned and sized to match the size and geometry of its corresponding field lens 23 and lenses of its corresponding optical system 16 (e.g. "integral imaging" as may be known in the art). In some such embodiments the precursor images corresponding to each projection unit 15 may be different. This difference between precursor images may result in slightly different light fields at different viewing positions, thereby providing a sensation of multiple depth planes.

In some embodiments, image formation plane 26 increases efficiency of a projection unit 15 and/or display 10 by recycling light (e.g. light that does not pass through optical system 16). For example, image formation plane 26 may reflect undesired light (e.g. light that does not pass through optical system 16, which may otherwise be desirable to absorb) back towards light source 21 and/or reflector 21A.

In some embodiments image formation plane 26 is an active element such as an LCD panel or light-valve display. In some such embodiments, a projected precursor image 26A may be updated dynamically in real time. In some embodiments image formation plane 26 is a passive element such as a printed transparency.

In some embodiments image formation plane 26 may comprise self-contained illumination sources. For example, the precursor image 26A on image formation plane 26 may be provided by a backlight-less display such as an OLED display, LED display or the like. In some such embodiments, imaging system 14 may omit light source 21 and/or field lens 23. In some embodiments field lens 23 focuses light from a backlight-less display onto optical system 16. In some embodiments, the precursor image 26A on image formation plane 26 may be provided by a back-lit LCD display or similar backlit display technology.

Optionally, image formation plane 26 and/or the precursor image 26 formed thereon may compensate for distortions that may be introduced by optical system 16. For example, image formation plane 26 and/or the precursor image 26 formed thereon may introduce radial distortions that may cancel (or reduce) radial distortions of optical system 16.

In some embodiments image formation plane 26 comprises a plurality of different precursor images 26A. For example, the plurality of precursor images 26A may comprise red, green and blue precursor images 26A of a scene. In some such embodiments each of the red, green and blue precursor images 26A may be digitally processed to provide a slightly different blur (e.g. removal of high frequency components by low pass filtering or otherwise) to compensate for chromatic aberrations that may be present in optical system 16.

As described elsewhere herein, optical system 16 redirects light corresponding to different pixels of a precursor image 26A on image formation plane 26 in different directions.

Optical system 16 of the illustrated (FIG. 3) embodiment comprises a first lens 32 and a second lens 34. First and second lenses 32 and 34 together may, for example, provide a globe lens. In some embodiments one or both of lenses 32, 34 comprises a meniscus lens. In some embodiments optical system 16 may be mass-produced using known molding techniques.

Figure 4A:
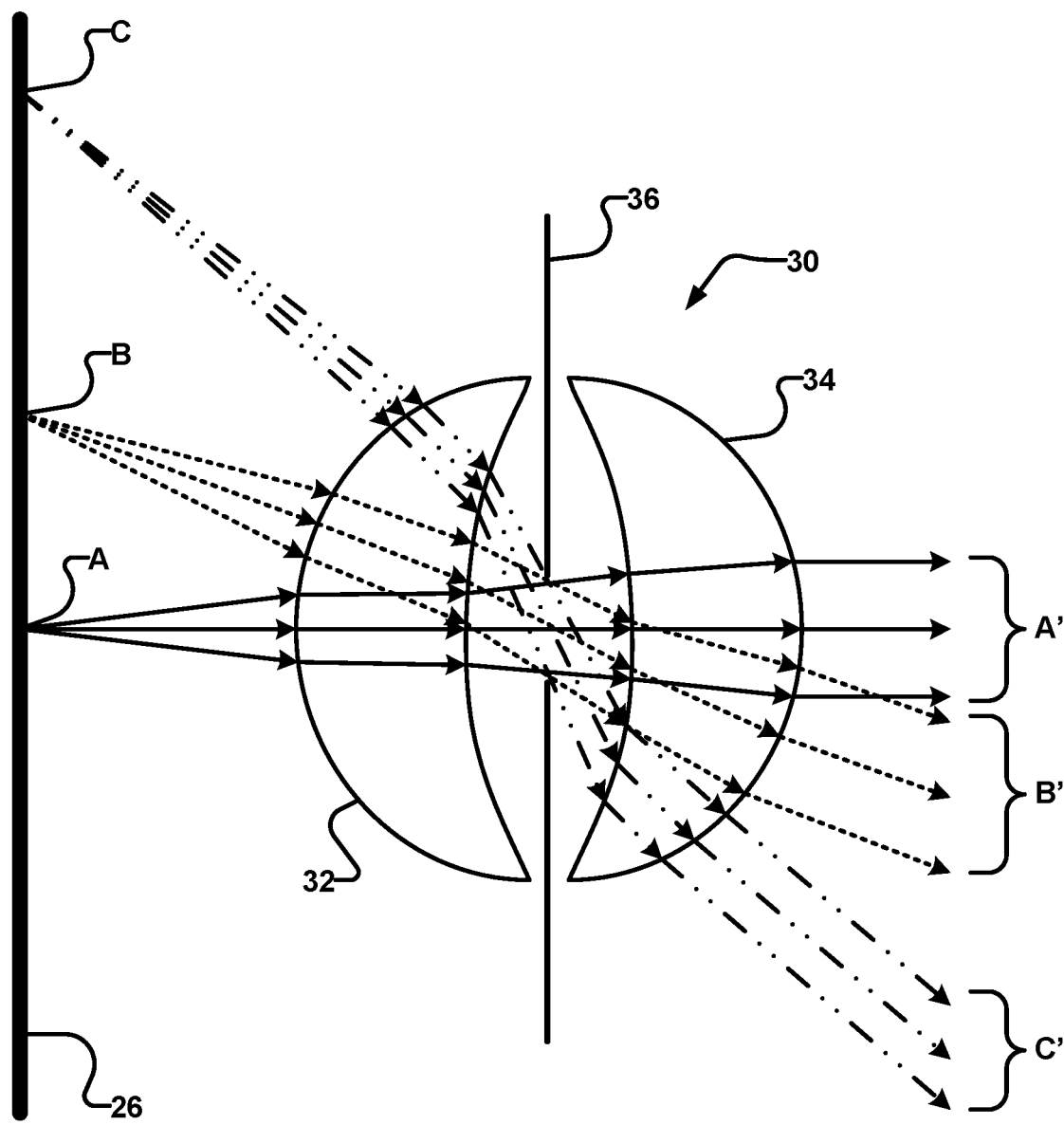
FIGS. 4A and 4B illustrate example light ray tracings through example embodiments of an optical system of the FIG. 3 projection unit.

FIG. 4A shows an example ray tracing of light passing through lenses 32, 34, where, for example, each of lenses 32, 34 comprises a meniscus lens. Light from pixels A, B and C of image formation plane 26 that passes through lenses 32 and 34 is collimated into beams A', B' and C' respectively. Redirected beams A', B' and C' may travel to a viewer's eyes.

Figure 4B:
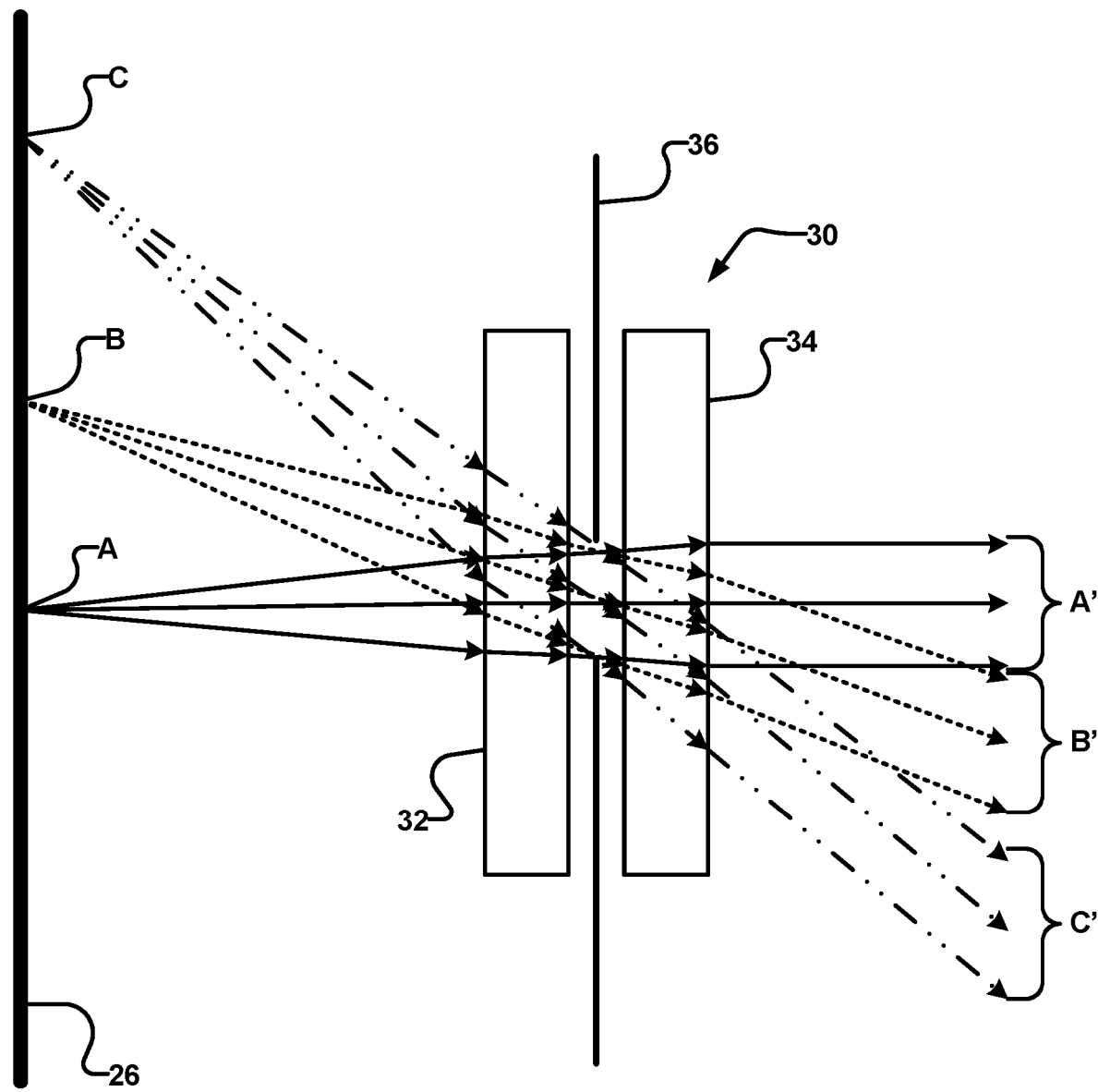

In some embodiments one or both of lenses 32, 34 may comprise faceted surfaces. In some such embodiments, one or both of lenses 32, 34 may comprise Fresnel lenses. FIG. 4B shows an example ray tracing of light passing through lenses 32, 34 in an example embodiment where lenses 32, 34 comprise Fresnel lenses. For clarity, the individual prisms of such Fresnel lenses 32, 34 are not illustrated in FIG. 4B.

In some embodiments lenses 32, 34 are conventional plastic or glass meniscus lenses, biconvex lenses, planar-convex lenses and/or the like.

In some embodiments lenses 32, 34 are symmetric. Symmetry of lenses 32, 34 may reduce effects of optical aberrations. For example, symmetry of lenses 32, 34 may correct optical aberrations, such as distortion, coma, transverse chromatic aberration, curvature of field and/or the like. Advantageously, symmetry of lenses 32, 34 may produce a relatively wide field of view with a relatively even angular distribution.

An air-gap (or a gap filled with some other suitable material) may separate lens 34 from lens 32. An aperture 36 may be positioned between lenses 32, 34. Aperture 36 may block off-axis light. Additionally, or alternatively, aperture 36 may reduce (or correct) effects of optical aberrations introduced by the other optical elements of projection unit 15. By way of non-limiting example, an aperture 36 having a relatively small lateral cross-section may result in an angular image that is relatively less distorted (or less likely to be distorted) by aberrations of lenses 32, 34, as compared to an aperture 36 having relatively large lateral cross-sectional area. However, the lateral cross-sectional dimensions of aperture 36 cannot be arbitrarily reduced, because an aperture 36 having relatively small lateral cross-section admits less light (e.g. fewer photons from the corresponding precursor image 26A pass through a relatively small aperture 36) and, consequently, results in a lower brightness angular image. In some embodiments a size of aperture 36 may be varied in real time.

Figure 4C:
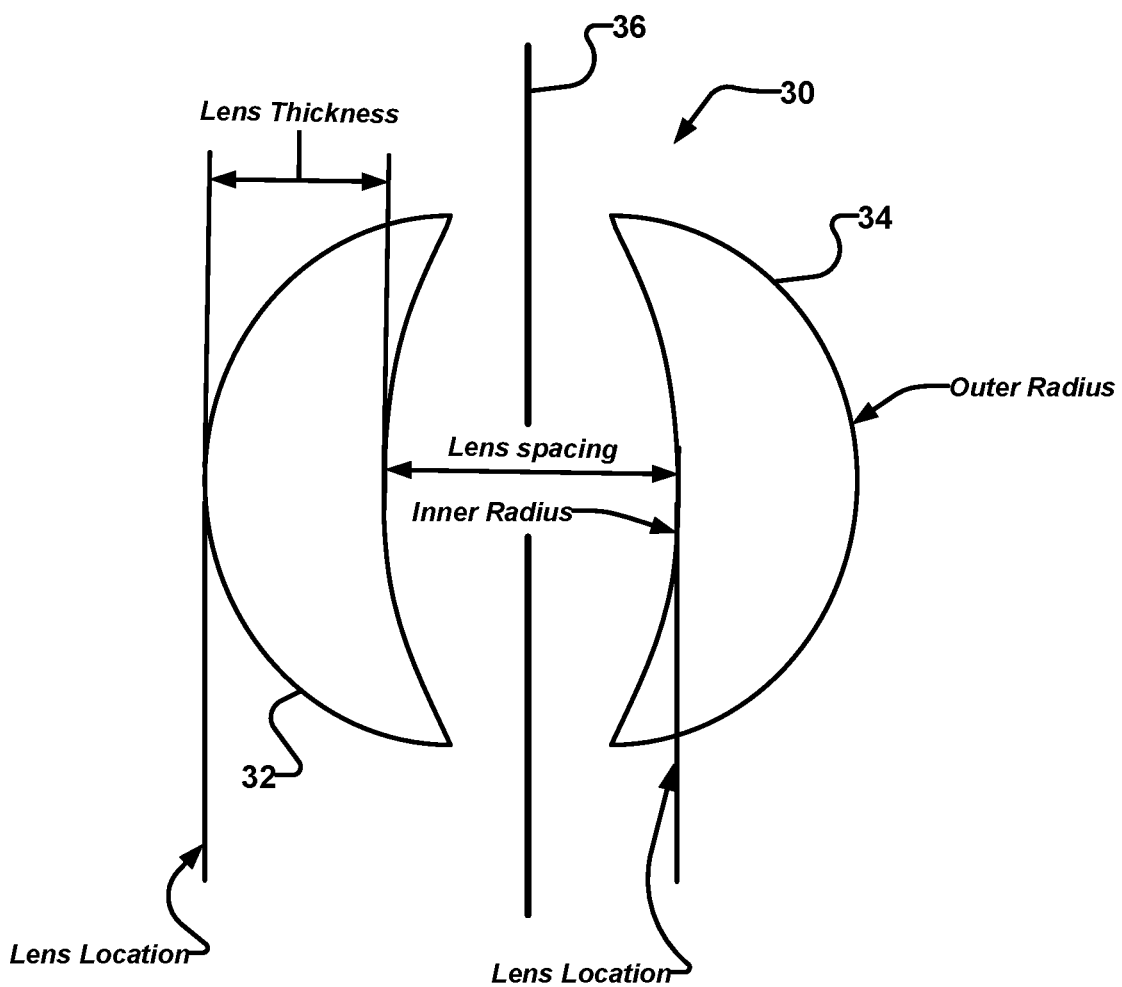
FIG. 4C schematically illustrates an optical system according to an example embodiment.

Lenses 32, 34 may be defined by a set of parameters which have an impact on the operation light field display 10. By way of non-limiting example, such parameters may comprise one or more of: optical power, an index of refraction of each lens, a thickness of each lens, radii of curvature of each lens surface (including both inner and outer surfaces), locations of each lens (e.g. relative to other elements of projection unit 15) and a spacing between lenses 32, 34 (see e.g. FIG. 4C). In some embodiments, parameters defining one or both of lenses 32, 34 may be configured (e.g. optimized) to reduce (or minimize) distortions and/or optical aberrations that may be introduced by lenses 32 and/or 34. In some embodiments, one or more of these parameters of lenses 32, 34 may be determined by an optimization process involving optimizing an objective function which may be referred to as an optical error metric.

In some embodiments, the objective function used in such an optimization comprises a number of cost terms. Such cost terms may comprise an optical aberration term associated with (which assigns cost to) one or more optical aberrations (e.g. spherical aberration and/or the like) associated with lenses 32, 34. Such cost terms may comprise a curvature of field term associated with (which assigns cost to) curvature of field. In some embodiments, such cost terms may comprise an angle of incidence term which attempts to equalize angular errors associated with light that impinges on optical system 16 over a range of incident angles. Such an angle of incidence term may assign cost to circumstances where the angular error associated with light at a first particular angle of incidence (e.g. at an off axis angle) is different from the angular error associated with light at a second particular angle of incidence (e.g. axially incident light). By way of non-limiting example, an angular error may be measured or simulated by a standard deviation (or other suitable distribution width metric) of the angles of light emitted by optical system 16 from a point source on image plane 26. A perfect lens would emit all parallel light from a point source on image plane 26 and, consequently, would have no standard deviation (no angular error). The objective function may include other cost terms. Each of the cost terms in the objective function may be assigned a desired weighting coefficient to emphasize the importance of their respective criteria relative to the criteria associated with other cost terms.

The objective function may be optimized (e.g. minimized or maximized) using a suitable optimization process to determine the set of parameters for lenses 32, 34 which will balance (e.g. optimize) the competing objectives of the various cost terms.

Figure 5:
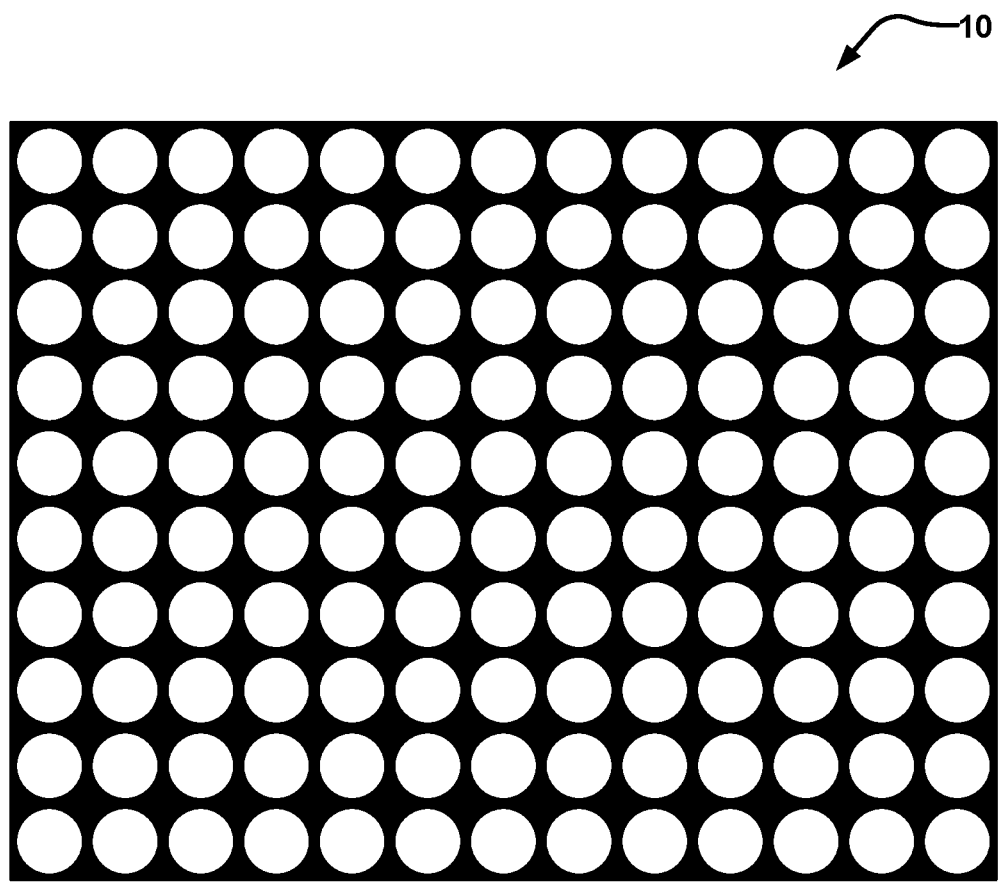
FIG. 5 schematically illustrates an example light field which may be generated by an array of projection units without their diffusion systems.

The plurality of optical systems 16 may produce an angular image of a scene. This angular image may be a low resolution angular image, as discussed above (e.g. because of the relatively low number of pixels in each precursor image 26A and/or because of the relatively low density of projection units 15). As discussed further below, the angular image produced by optical systems 16 may be diffused by diffusion systems 18. If, for the sake of illustration, the scenario is considered where projection units 15 do not include diffusion systems 18, the individual projection units 15 may create an angular image having non-uniform light distribution. More particularly, the size and/or spacing of apertures 36 and/or individual projection units 15 may give rise to non-uniform light distributions, where the discrete nature of the projection units 15 may be discernable to a human viewer as shown (by way of schematic example) in FIG. 5. It may be desirable for light field display 10 to generate an angular image where individual projection units 15 are not visible or discernable to a normal human viewer. This may be referred to as generating an angular image that is "spatially uniform" as alluded to above.

Display 10 of the illustrated embodiments comprises a diffusion system 18 (see e.g. FIG. 3). Diffusion system 18 may spread the light output from optical systems 16 to provide an angular image having spatial uniformity which obfuscates optical systems 16 (and imaging systems 14) from human viewers. Additionally, diffusion system 18 may reduce angular distortions that may have been introduced into the angular image by optical systems 16 (and/or imaging system 14). In currently preferred embodiments, it may be an objective for diffusion system 18 to introduce a minimal angular diffusion into the angular image, while another (competing) objective of diffusion system 18 may be to providing sufficient spatial uniformity in the angular image to mask optical systems 16 (and imaging systems 14) from human viewers.

Diffusion system 18 may comprise a first diffuser 42 that is relatively proximate to optical system 16 and a second diffuser 44 that is relatively distal from optical system 16. First diffuser 42 may diffuse the generated light fields to conceal optical systems 16 and/or to produce a spatially uniform distribution of light. Second diffuser 44 may be separated from the first diffuser 42 by a distance $d_{diffuser\ spacing}$. In currently preferred embodiments diffusion system 18 may be optimized to achieve the competing objectives of concealing optical system 16 (and/or producing a uniform spatial distribution of light) and minimizing diffusion of light. In some such embodiments, lateral spreading of light is maximized while angular spreading of light is minimized.

First and second diffusers 42, 44 may each comprise a single diffusing plane that spans display 10. That is, first and second diffusers 42, 44 may be shared between a plurality of laterally adjacent projection units 15.

In some example embodiments, each of first and second diffusers 42, 44 comprise a single panel that spans a lateral area of display 10. One or both of diffusers 42, 44 may be partially opaque to light. In some embodiments one or both of diffusers 42, 44 comprises an etched pattern configured to diffuse light. In some embodiments, one or both of diffusers 42, 44 comprise embedded prisms configured to diffuse light by a set amount.

In some embodiments first diffuser 42 adds some angular diffusion to light emitted from optical systems 16. First diffuser 42 may spread light laterally such that when the light reaches second diffuser 44 the light is spatially uniform. Typically the greater the separation between first and second diffusers 42, 44, the less diffusion is needed for light to be spatially uniform when it impinges on second diffuser 44.

In some embodiments, an amount of diffusion of first diffuser 42 for a given viewing angle ø may, for example, produce a distribution of light L(ø) as follows:

$$L(\phi) = \begin{cases} \dfrac{3}{4s} - \phi^2, & |\phi| \le \dfrac{s}{2} \\ \dfrac{1}{2s^3}\left(|\phi| - \dfrac{3s}{2}\right)^2, & \dfrac{s}{2} < |\phi| \le \dfrac{3s}{2} \\ 0, & |\phi| > \dfrac{3s}{2} \end{cases} \quad (2)$$

where $s = \tan^{-1}$ (lens spacing/$d_{diffuser\ spacing}$)
where "lens spacing" is the distance (in the axial direction) between an inner surface of lens 32 and an inner surface of lens 34 and $d_{diffuser\ spacing}$ is the axial direction distance between diffusers 42, 44.

In some embodiments, first diffuser 42 includes technology like (or identical to) the diffusion technology described in U.S. Pat. No. 9,534,746 and entitled HIGH-UNIFORMITY LIMITED-SPREAD POINT SPREAD FUNCTION LIGHT EMITTER which is hereby incorporated herein by reference for all purposes.

First diffuser 42 may diffuse light so that it is spatially uniform when it impinges on second diffuser 44. Second diffuser 44 may then perform an additional diffusion to maximize or otherwise increase the angular uniformity of the light. The additional diffusion provided by second diffuser 44 may have the same characteristics as first diffuser 42, following equation (2).

In some embodiments, diffusion system 18 comprises a single diffuser. In some such embodiments, optical system 16 is configured to at least partially diffuse light by a desired amount. Alternatively, or additionally, optical system 16 may be partially defocused in some such embodiments.

In some embodiments, diffusion system 18 protects optical systems 16 and/or imaging systems 14 from being damaged. In some embodiments diffusion system 18 encloses optical systems 16 and/or imaging systems 14 from environmental elements (e.g. moisture, dust, etc.).

In some embodiments, brightness of one or more light sources 21 may be varied. In some embodiments, brightness may be varied dynamically in real time. In some such embodiments, display 10 may simulate a sun, moon, stars and/or the like traversing a horizon over the course of a day. Light sources 21 configured to illuminate pixels corresponding to the sun, moon, stars, etc. may be brighter than other light sources 21. In some embodiments, light sources 21 corresponding to the sun may be significantly brighter than other light sources 21, such that the sun's illumination energy may be simulated within an interior environment (e.g. a person feels heat radiating from the simulated sun).

In some embodiments, display 10 is operable to simulate weather conditions. For example, image formation plane 26 may be updated in real time for display 10 to simulate rain drops, accumulating snow, etc. on an outdoor surface of a partially diffusing window being simulated.

In some embodiments, one or more light field displays 10 are incorporated into new designs or retrofits of interior environments, such as shopping malls, underground walk ways, atria, working spaces, living spaces and/or the like to provide occupants with a sense of space that exceeds the space which is really present. In some embodiments, one or more displays 10 are configured to simulate a window, an entire wall of windows, a glass ceiling (may require a viewing range of +/−90 degrees) and/or the like. In some embodiments, one or more displays 10 replace a traditional lighting system. In some such embodiments, one or more displays 10 may use less energy than an existing lighting system to illuminate an interior space.

In some embodiments, one or more light displays 10 may be coupled to display a larger angular image. In some such embodiments, one or more of the displays 10 may communicate with other ones of the displays 10 to coordinate which display 10 will display what portion of the image. In some embodiments, the displayed image may be updated in real time.

In some embodiments, one or more displays 10 provide a stable visual reference.

A human body uses a number of sensory systems to determine its orientation and position. An inner ear of the body may provide relative pressure information that may be used to, for example, estimate the body's orientation with respect to gravity. Vision may provide, for example, information about relative changes of orientation and/or position. If these two sensory systems conflict, a person may become nauseous (e.g. suffer from "motion sickness").

Motion sickness may occur in a number of environments. For example, motion sickness may occur in an enclosed window-less cabin (e.g. an interior cabin of a marine vessel). As another non-limiting example, a human may suffer an episode of motion sickness within a cabin of a moving vehicle (e.g. car, truck, bus, airplane, boat, etc.) as a result of focusing on an interior of the cabin (e.g. watching a movie, reading, etc.). Swaying of buildings may also induce motion sickness.

Conventional two-dimensional displays cannot provide stable visual references as a person's eyes would focus and converge on an image plane of the display. In contrast, display 10 described elsewhere herein may be configured to produce an angular image that counters one or more changes in orientation of an environment.

In some embodiments one or more accelerometers sense changes in orientation of an environment. An image processing engine may process the measured changes in orientation. The image processing engine may vary a scene to be displayed by the one or more displays 10 to compensate for the detected change(s) in orientation. Doing so may provide a stable visual reference.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

In some embodiments, aspects of the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A light field display for displaying an angular image, the light field display comprising:
    a plurality of projection units spaced laterally apart from one another in one or more lateral directions, each projection unit having an optical axis which is orthogonal to the one or more lateral directions, each projection unit comprising:
        an imaging system for providing a precursor image on an image plane;
        an optical system comprising one or more lenses shaped and located to receive light from pixels of the precursor image and to emit redirected light transmitted therethrough;
        a diffusion system located to receive the redirected light and operative to laterally spread light that is transmitted therethrough and to thereby emit diffuse light;
    wherein the diffuse light emitted from the diffusion systems of the plurality of projection units provides an angular image perceptible to a human viewer;
    wherein adjacent pixels of the precursor image are directed at different angles of the angular image; and
    wherein the lateral spreading of the diffuse light emitted from the diffusion systems of the plurality of projection units obfuscates the existence of the projection units from being discernable within the angular image by the human viewer;
    wherein the diffusion system comprises one or more diffusion elements, each of which is shaped by patterning and/or located relative to other components of the light field display to achieve a desired tradeoff between minimizing spatial diffusion of the diffuse light and spatial uniformity of the diffuse light.

2. The light field display according to claim 1 wherein the diffusion system comprises a first diffuser proximate, in an axial direction, to the optical system and a second diffuser spaced apart, in the axial direction, from the first diffuser.

3. The light field display according to claim 1 wherein the optical system further comprises a first lens and a second lens that are shaped and/or located to provide a globe lens.

4. The light field display according to claim 1 wherein the optical system further comprises a first lens and a second lens and an optical aperture located in a gap between the first and second lenses.

5. The light field display according to claim 1 wherein each of the projection units has a lateral cross-section dimension of about 2.5 cm.

6. The light field display according to claim 1 wherein the image plane is operable to compensate for distortions introduced by the optical system.

7. A light field display for displaying an angular image, the light field display comprising:
- a plurality of projection units spaced laterally apart from one another in one or more lateral directions, each projection unit having an optical axis which is orthogonal to the one or more lateral directions, each projection unit comprising:
  - an imaging system for providing a precursor image on an image plane;
  - an optical system comprising one or more lenses shaped and located to receive light from pixels of the precursor image and to emit redirected light transmitted therethrough;
  - a diffusion system located to receive the redirected light and operative to laterally spread light that is transmitted therethrough and to thereby emit diffuse light;
- wherein the diffuse light emitted from the diffusion systems of the plurality of projection units provides an angular image perceptible to a human viewer;
- wherein adjacent pixels of the precursor image are directed at different angles of the angular image; and
- wherein the lateral spreading of the diffuse light emitted from the diffusion systems of the plurality of projection units obfuscates the existence of the projection units from being discernable within the angular image by the human viewer;
- wherein the angular image has a plurality of depth planes;
- wherein the diffusion system comprises one or more diffusion elements, each of which is shaped by patterning and/or located relative to other components of the light field display to achieve a desired tradeoff between minimizing spatial diffusion of the diffuse light and spatial uniformity of the diffuse light.

8. The light field display according to claim 7 wherein the diffusion system comprises a first diffuser proximate, in an axial direction, to the optical system and a second diffuser spaced apart, in the axial direction, from the first diffuser.

9. The light field display according to claim 7 wherein the optical system further comprises a first lens and a second lens, wherein one or both of the first and second lenses comprise faceted surfaces.

10. The light field display according to claim 7 wherein the image plane is operable to compensate for distortions introduced by the optical system.

11. The light field display according to claim 7 wherein the image plane comprises red, green and blue precursor images, each of the precursor images generated in a different way to compensate for chromatic aberration.

12. A light field display for displaying an angular image, the light field display comprising:
- a plurality of projection units spaced laterally apart from one another in one or more lateral directions, each projection unit having an optical axis which is orthogonal to the one or more lateral directions, each projection unit comprising:
  - an imaging system for providing a precursor image on an image plane;
  - an optical system comprising one or more lenses shaped and located to receive light from pixels of the precursor image and to emit redirected light transmitted therethrough;
  - a diffusion system located to receive the redirected light and operative to laterally spread light that is transmitted therethrough and to thereby emit diffuse light;
- wherein the diffuse light emitted from the diffusion systems of the plurality of projection units provides an angular image perceptible to a human viewer;
- wherein adjacent pixels of the precursor image are directed at different angles of the angular image; and
- wherein the lateral spreading of the diffuse light emitted from the diffusion systems of the plurality of projection units obfuscates the existence of the projection units from being discernable within the angular image by the human viewer;
- wherein the diffusion system is shaped, for a given viewing angle $\phi$, to produce a distribution of light provided at least approximately by $L(\phi)$, where:

$$L(\phi) = \begin{cases} \dfrac{3}{4s} - \phi^2, & |\phi| \le \dfrac{s}{2} \\ \dfrac{1}{2s^3}\left(|\phi| - \dfrac{3s}{2}\right)^2, & \dfrac{s}{2} < |\phi| \le \dfrac{3s}{2} \\ 0, & |\phi| > \dfrac{3s}{2} \end{cases}$$

where $s = \tan^{-1}$ (lens spacing/$d_{diffuser\ spacing}$)
and wherein lens spacing is an axial direction distance between opposing inner surfaces of lenses of the optical system and $d_{diffuser\ spacing}$ is an axial distance between the first and second diffusers.

13. The light field display according to claim 12 wherein the optical system further comprises a first and a second lens, wherein one or both of the first and second lenses comprise a Fresnel lens.

14. A light field display for displaying an angular image, the light field display comprising:
- a plurality of projection units spaced laterally apart from one another in one or more lateral directions, each projection unit having an optical axis which is orthogonal to the one or more lateral directions, each projection unit comprising:
  - an imaging system for providing a precursor image on an image plane;
  - an optical system comprising one or more lenses shaped and located to receive light from pixels of the precursor image and to emit redirected light transmitted therethrough;
  - a diffusion system located to receive the redirected light and operative to laterally spread light that is transmitted therethrough and to thereby emit diffuse light;
- wherein the diffuse light emitted from the diffusion systems of the plurality of projection units provides an angular image perceptible to a human viewer;
- wherein adjacent pixels of the precursor image are directed at different angles of the angular image; and
- wherein the lateral spreading of the diffuse light emitted from the diffusion systems of the plurality of projection units obfuscates the existence of the projection units from being discernable within the angular image by the human viewer;

wherein each of the plurality of projection units:
is arranged to form a lateral grid-like pattern of projection units that spans a laterally extending plane of the light field display; and
comprises a light source operable to emit light and a field lens shaped and/or located to:
receive the emitted light; and
focus the emitted light through an aperture of the optical system.

15. A light field display for displaying an angular image, the light field display comprising:
a plurality of projection units spaced laterally apart from one another in one or more lateral directions, each projection unit having an optical axis which is orthogonal to the one or more lateral directions, each projection unit comprising:
an imaging system for providing a precursor image on an image plane;
an optical system comprising one or more lenses shaped and located to receive light from pixels of the precursor image and to emit redirected light transmitted therethrough;
a diffusion system located to receive the redirected light and operative to laterally spread light that is transmitted therethrough and to thereby emit diffuse light;
wherein the diffuse light emitted from the diffusion systems of the plurality of projection units provides an angular image perceptible to a human viewer;
wherein adjacent pixels of the precursor image are directed at different angles of the angular image; and
wherein the lateral spreading of the diffuse light emitted from the diffusion systems of the plurality of projection units obfuscates the existence of the projection units from being discernable within the angular image by the human viewer;
wherein the image plane is an active element that is operable to update the precursor image at any time.

16. A light field display for displaying an angular image, the light field display comprising:
a plurality of projection units spaced laterally apart from one another in one or more lateral directions, each projection unit having an optical axis which is orthogonal to the one or more lateral directions, each projection unit comprising:
an imaging system for providing a precursor image on an image plane;
an optical system comprising one or more lenses shaped and located to receive light from pixels of the precursor image and to emit redirected light transmitted therethrough;
a diffusion system located to receive the redirected light and operative to laterally spread light that is transmitted therethrough and to thereby emit diffuse light;
wherein the diffuse light emitted from the diffusion systems of the plurality of projection units provides an angular image perceptible to a human viewer;
wherein adjacent pixels of the precursor image are directed at different angles of the angular image; and
wherein the lateral spreading of the diffuse light emitted from the diffusion systems of the plurality of projection units obfuscates the existence of the projection units from being discernable within the angular image by the human viewer;
wherein the angular image has a plurality of depth planes;
wherein the image plane is an active element that is operable to update the precursor image at any time.

17. A light field display for displaying an angular image, the light field display comprising:
a plurality of projection units spaced laterally apart from one another in one or more lateral directions, each projection unit having an optical axis which is orthogonal to the one or more lateral directions, each projection unit comprising:
an imaging system for providing a precursor image on an image plane;
an optical system comprising one or more lenses shaped and located to receive light from pixels of the precursor image and to emit redirected light transmitted therethrough;
a diffusion system located to receive the redirected light and operative to laterally spread light that is transmitted therethrough and to thereby emit diffuse light;
wherein the diffuse light emitted from the diffusion systems of the plurality of projection units provides an angular image perceptible to a human viewer;
wherein adjacent pixels of the precursor image are directed at different angles of the angular image; and
wherein the lateral spreading of the diffuse light emitted from the diffusion systems of the plurality of projection units obfuscates the existence of the projection units from being discernable within the angular image by the human viewer;
wherein the angular image has a plurality of depth planes;
one or more motion sensors operative to detect one or more changes in orientation of the light field display; and
an image processing engine configured to adjust the precursor image based on the one or more detected changes in orientation to produce an angular image that counters one or more of the detected changes in orientation.

* * * * *